United States Patent [19]

Roychoudhury

[11] Patent Number: 4,927,566

[45] Date of Patent: May 22, 1990

[54] OIL AND FAT RELEASE METHOD

[75] Inventor: Rathindra N. Roychoudhury, Marysville, Ohio

[73] Assignee: Nestec S.A., Vevey, Switzerland

[21] Appl. No.: 143,351

[22] Filed: Jan. 12, 1988

[51] Int. Cl.[5] .......................... C09F 5/00; C11B 1/00

[52] U.S. Cl. .......................... 260/412; 260/428.5; 260/412.8; 260/412.2; 260/412.4

[58] Field of Search .................. 260/428.5, 412.8, 412, 260/412.2, 412.4

[56] References Cited

PUBLICATIONS

AOAC Official Methods of Analysis (1984) p. 160.

AOAC Official Methods of Analysis (1984) pp. 242–243.

A.O.C.S. Official Method Aa-4-38 (1984) pp. 1-4.

*Primary Examiner*—Patrick P. Garvin

*Assistant Examiner*—E. D. Irzinski

*Attorney, Agent, or Firm*—Vogt & O'Donnell

[57] ABSTRACT

Glycerol esters of fatty acids are obtained from ester-containing plant, animal and marine materials by adding water to the materials for dissociating and releasing the esters from the materials so that the esters may be absorbed by and recovered from an inert absorbing substance.

10 Claims, No Drawings

OIL AND FAT RELEASE METHOD

BACKGROUND OF THE INVENTION

The present invention relates to obtaining glycerol esters of fatty acids from plant, animal and marine materials.

It is well-known that many diverse materials contain glycerol esters of fatty acids which are comprised primarily of triglycerides and which are commonly known as oils and fats. Oils are generally characterized as being liquid at ambient temperature whereas fats are generally characterized as being solid or semi-solid at ambient temperature.

Many oil- and fat-containing materials include components associated with glycerol esters of fatty acids which are of benefit in various ways. For example, associated with the esters may be valuable free fatty acids such as omega-3 fatty acids which are highly unsaturated fatty acids and which are of interest and gaining attention as therapeutic and pharmacological agents, particularly in the treatment of cardiovascular conditions and diseases. Omega-3 fatty acids are found in high levels in fish oil, but these fatty acids may be found also in such diverse materials as common beans, cauliflower, purslane, legumes and nuts and seeds.

Many oil- and fat-containing materials with which omega-3 fatty acids are associated, however, contain only relatively small amounts of glycerol esters of fatty acids, i.e., on the order of from less than 1% to 3% of the esters by weight, but the amount of omega-3 fatty acids included with the esters is relatively high. Although obtaining the omega-3 fatty acids from such materials would be of value, due to the low amounts of the esters in these materials, obtaining the esters and the omega-3 fatty acids, is not believed to have been heretofore practical or economical. Likewise, efficient and accurate quantitative determination of amounts of oils and fats contained in various materials can be of importance in regard to quality control procedures, or for meeting labeling requirements, for example.

Methods which utilize direct solvent extraction are known for analytical quantitative determination of the amounts of oils and fats in materials which contain relatively low amounts of the same. One such method is the Goldfisch Extractor method, which is a direct solvent extraction method as described in *A.O.C.S. Official Method* Aa 4-38 (1984). Another direct extraction method is known as the Soxhlet Extraction method and is described in *AOAC Official Methods of Analysis* (1984) at pages 242-243. A further method, a gravimetric method, which utilizes an extraction tube known as the Mojonnier extraction tube, comprises solvent extraction from a sample prepared with alcohol and hydrochloric acid and ether, with oil extraction performed by petroleum ether, as described in *AOAC Official Methods of Analysis* (1984) at page 160.

SUMMARY OF THE INVENTION

The present invention provides not only a means for effecting efficient and accurate analytical determinations of the amounts of oils and fats contained in materials but also provides a practical method for recovering useful oils and fats and associated components from a variety of materials.

The present invention thus provides a process for obtaining glycerol esters of fatty acids from various materials and is particularly useful in obtaining those esters from materials containing relatively small quantities of the same and is characterized by releasing the esters from the materials, absorbing the released esters with an inert absorbing substance and then recovering the released esters from the inert absorbing substance.

For purposes of this disclosure and claims, the terms "glycerol fatty acid esters", "fatty acid esters", "esters" and "oils" and "fats" are to be understood as being inclusive of each other term. Such materials are characterized as being comprised primarily of triglycerides but also are intended to be inclusive of long chain fatty alcohols and free fatty acids and other components which are recognized by one skilled in the art of oil and fat chemistry as being associated with the esters upon extraction from the materials.

The present invention is further characterized in that the process is effected by adding water to glycerol fatty acid ester-containing materials, including plant, animal and marine materials, and extracts thereof, for dissociating and releasing the esters and associated components from the materials for obtaining a liquid comprising water and the esters, absorbing the liquid with an inert absorbing substance, drying the liquid-containing inert absorbing substance for removing water from the inert absorbing substance and absorbed esters, extracting the esters from the inert absorbing substance with a solvent and removing the solvent from the esters.

Non-water-soluble materials which may be utilized in the practice of the present invention include carbohydrate-proteinaceous materials which contain glycerol esters of fatty acids and which are capable of absorbing water. Materials which are particularly desirable contain, for example, amounts of other useful associated components such as free fatty acids, in particular, omega-3 fatty acids. Such materials include legumes, vegetables, and various marine and other materials which will be apparent readily to the artisan. For example, common beans contain approximately 1.25% oil; approximately 40% of this oil is comprised of omega-3 fatty acids. It is reported that approximately 50% of the fat contained in cauliflower is comprised of omega-3 fatty acids. Purslane is a vegetable found to have significant amounts of omega-3 fatty acids included with its esters. So, too, it is reported that about 30% of the fat contained in shrimp is comprised of omega-3 fatty acids.

Water-soluble materials with which the present invention may be practiced include any water-soluble material which includes some esters. For example, watersoluble extracts of various materials including extracts of the above non-water-soluble materials, and materials as diverse as soluble coffee, soluble tea and dehydrated soluble soup stocks may be employed in the practice of the present invention.

In the case of non-water-soluble ester-containing materials, the esters are dissociated and released from the materials by adding water to the materials in an amount and under conditions sufficient for enabling the water to pass into and/or through and be absorbed by the water-insoluble material for expelling the esters from the material into an aqueous medium. In the case of water-soluble materials, the esters are dissociated and released from the materials by adding water in an amount and under conditions sufficient for dissolving the water-soluble materials for forming an aqueous solution of the water-soluble materials. Thus, glycerol esters of fatty acids contained in the materials processed in accordance with the present invention are displaced or dissociated from the ester-containing material by water and released into a liquid comprising the esters and water.

The inert absorbing substances useful for practice of the present invention preferably will have a high affinity for absorbing the esters and water but more particularly, the inert absorbing substances are those substances which are water-insoluble, are inert to organic solvents, those which do not contain esters and those which, particularly in the case of water-soluble ester-bearing materials, have a low affinity for water-soluble solids such that water-soluble solids, which have been absorbed with water and the esters, readily can be separated from the inert absorbing substance after removal of water and the esters so the substance can be reused.

After the inert absorbing substance has absorbed the liquid, that is, water and the released esters and any water-soluble solids released from the treated material with the esters, drying of the liquid-containing inert absorbing substance may be accomplished by various conventional means under conditions such that the esters are not degraded.

Recovery of the released esters may be effected by removing the esters from the dried inert absorbing substance such as by extracting the esters with a variety of solvents suitable for dissolving the released esters. Recovery of the released esters from the solvent may be accomplished by removing the solvent from the esters by various conventional means. When fatty acids or other associated components are to be obtained from the recovered esters, such may be effected by separation methods familiar to the artisan.

These and other features and advantages will be further apparent from the following Detailed Description of the Invention and Examples which are illustrative of the present invention.

DETAILED DESCRIPTION OF THE INVENTION AND EXAMPLES

In practicing the invention, water is first added to glycerol fatty acid ester-bearing material in an amount and under conditions sufficient for dissolving a water-soluble material or for saturating a non-water-soluble material such that in each case, the glycerol esters of fatty acids are dissociated and released from the material into water. The resultant liquid thus contains water and the esters and any water-soluble solids dissociated and released from the material. The inert absorbing substance is then added to the ester-containing liquid in an amount sufficient for absorbing substantially all of the liquid.

By operating in accordance with the present invention, it has been found that esters can be recovered from ester-containing liquid having well in excess of 50% water-soluble solids based upon the weight of the liquid and also from liquid having less than 1% water-soluble solids by weight of the liquid. Particularly for analytical procedures performed in accordance with the present invention, care is to be taken to follow accepted quantitative analytical procedures for recovering and absorbing, for practical purposes, all of the liquid by means of the inert absorbing substance.

With either water-soluble or non-water-soluble materials, in most cases it will be found useful to utilize hot water for dissociating and releasing the esters from the material. Advantageously, heating to temperatures of up to 100° C. and above may be utilized for dissociating and releasing the esters from the material. Depending upon the character of the material, such temperatures usefully may be maintained for a short period of time, such as from about 30 seconds to one minute for water-soluble materials, and for somewhat longer periods, such as for from about 10 minutes to about one hour, for non-water-soluble materials. Agitation may be utilized advantageously at least periodically. Pressure to obtain temperatures higher than 100° C. may be utilized, but temperatures and pressures which could compositionally alter or degrade the esters should be avoided.

As those skilled in the art will appreciate, differentiation may be made between "free" fatty acid esters, which are readily available for dissociation and release from a material, and fatty acid esters which are "bound" to the material, the latter of which require more energy for dissociation and release from a material than the former. This difference is of particular importance in the context of the accuracy and deviation of quantitative analytical determinations which can be performed after performing the ester-release method of the present invention. For non-analytical procedures, however, whereby esters or components thereof are sought for further use, one skilled in the art readily can make determinations, based upon economy or efficiency, of the value and to what extent release of bound esters are desired such as via manipulating the conditions utilized.

In the case of making quantitative determinations, it has been found that most accurate results occur with ester-containing liquids having solids concentrations below about 15% solids by weight based upon the weight of the liquid and preferably from about 5% to about 15% solids by weight of the liquid. For example, in the case of soluble coffee, at a solids concentration of about 40% to about 45% by weight, at temperatures of about 100° C., free oil is readily released but bound oil is not released to an appreciable extent from the water-soluble solids. As the solids concentration is reduced under such temperature conditions, further bound oil is released. At solids concentrations of from about 15% to about 5% by weight, substantially all of the bound oil is released from the water-soluble solids into the ester-containing liquid.

As for non-water-soluble materials containing glycerol esters of fatty acids, as noted above, the materials must be capable of absorbing water for dissociating and releasing the esters. To assist in releasing the esters from these materials, in addition to heat and agitation, the materials advantageously may be comminuted for enabling efficient ester release.

The amount of inert absorbing substance which is sufficient for absorbing the ester-containing liquid, which includes water, the released esters and any released water-soluble materials, will depend upon its absorbing power and density, for example. Generally, the inert absorbing substance is utilized in an amount by weight of from about 20% to about 75% of the weight of the liquid to be absorbed and preferably from about 35% to about 60% and most preferably from 45% to about 55% by weight of the weight of the liquid to be absorbed.

For practical purposes, the amount of inert absorbing substance most easily may be determined by equating it to the weight of water added to the material from which the esters are to be released. In the case of non-water-soluble materials, the weight of water absorbed by the material may be taken into account, of course, for making the determination of the amount of inert absorbing material to be utilized. Particularly in analytical methods, for most efficient recovery of the esters and for minimizing deviation of results, a high ratio of inert absorbing substance to liquid by weight should be avoided because the relative amount of the available amount of ester as compared with the total absorbing volume of the inert absorbing substance will tend to result in greater deviation of results for like samples.

Absorbing of the liquid may be effected simply by adding and mixing the inert absorbing substance with the liquid. At least periodic agitation of the liquid and inert absorbing substance is advantageously utilized for transferring the liquid to the inert absorbing substance.

Although heat up to 100° C. or above can be utilized when absorbing the ester-containing liquid, absorption may be carried out effectively at any temperature at which the ester remains fluid, and preferably, any water-soluble substances remain in solution. Also, preferably, the absorbing step is carried out at a temperature in which the liquid is not in the form of an emulsion, in that, obtaining at least some phase separation of the liquid has been noted as being advantageous for absorption of the liquid by the inert absorbing substance. Generally, particularly when heat is utilized for assisting in release of the esters, the estercontaining liquid, in the case of release from a watersoluble material, and the liquid and non-water-soluble material from whence esters were derived, in the case of release from non-water-soluble materials, are cooled prior to the absorbing step, and generally, cooling may proceed to room or ambient temperature.

The substances, as previously broadly defined, which advantageously may be utilized as the inert absorbing substances include diatomaceous earth, Fuller's earth or bentonite clay, cellulose fiber such as FIBRACELL by Johns Manville, microcrystalline cellulose such as AVICEL by Johns Manville, cellulose wood fiber such as SOLKA-FLOC by Grefco, volcanic rock such as PERELITE by Grefco, cotton fibers and preferably, celite, and other absorbent materials which will be apparent to the artisan.

When drying, that is, removing water from the liquid-bearing inert absorbing substance, various methods may be utilized, with vacuum drying or freeze drying being preferred. The main criterion for drying is that the esters not be degraded and an inert environment is preferred during drying.

After drying, thereby removing water from the inert absorbing substance and the absorbed esters, the esters may be extracted from the inert absorbing substance by a suitable solvent, preferably an organic solvent which has a low affinity for any water-soluble solids which are included in the substance with the esters. Long-chain hydrocarbon solvents, such as $C_5$ to $C_7$ hydro-carbons, alone or in combination, are preferred. Petroleum ether and hexane are most preferred. $C_8$ and higher hydrocarbons may be operable but are less desired because higher temperatures are required for removing such solvents from the recovered esters by evaporation, for example, thus risking degradation of the esters. Also a variety of other solvents, readily apparent to those skilled in the art, although less preferred, are useful and include methylene chloride and chloroform, for example. If the recovered esters are to be utilized in food or pharmaceutical applications, the solvent should be food or pharmaceutically acceptable.

After extraction, the esters are then separated from the solvent by removing the solvent by various means known to those skilled in the art, such as by evaporation or distillation, for example.

After extracting the esters, water-soluble solids absorbed with the released esters and water by the inert absorbing substance may be removed from the inert absorbing substance such as by washing or flushing the solids from the inert absorbing substance for regenerating the substance for further use.

In the case of analytical methods, the amount of esters may be quantified by measuring with various methods including the Goldfisch and Soxhlet procedures mentioned above by eliminating, obviously, the direct extraction feature of these methods. In the case where esters are extracted for obtaining other components associated with the esters, such as free fatty acids, further procedures known to those skilled in the art can be applied for extracting or deriving the same, such as fractionation, distillation, or chromatography, for example.

These and other features and advantages of the present ester-release method will become further apparent from the following Examples which are illustrative of the invention. Parts and percentages are by weight unless otherwise indicated.

EXAMPLE I

A soluble coffee powder is prepared. A 15 g sample is ground with a mortar and pestle and mixed thoroughly and uniformly. 2 g of the sample are measured and placed in a 150 ml beaker with a spatula which is thereafter left in the beaker. A solution of soluble coffee solids is prepared by adding 12 ml of boiling deionized water to the sample in the beaker with stirring by the spatula to dissolve the coffee solids. The solution is heated until boiling starts while avoiding bumping The beaker is removed from the heat source, and 6 g of celite (Johns Manville 545 grade) is added to and mixed with the solution until the mixture is uniform. After the celite has absorbed the water and oil, the celite mixture is dried in the beaker in a vacuum oven at 100° C. for 2 hours.

After drying, the dried mixture is scraped from the beaker with the spatula and ground to a moderately small size. The ground mixture is placed in a WHATMAN extraction thimble having an 80 mm length and an inner and outer diameter of 22 mm and 24 mm, respectively. The thimble is tapped to settle the sample and a glass wool plug is put on the top of the thimble to assist in distributing solvents. The sample beaker is washed with 10 ml of petroleum ether (B. P. 35° C. to 60° C.) and the washings are poured into the thimble.

Utilizing Goldfisch extractor equipment as in *A.O.C.S. Official Method* Aa 4–38, 50 ml of petroleum ether is added to the beaker and the solvent in the beaker is refluxed, condensed and dripped into the thimble over a period of one hour. The thimble is removed and the petroleum ether is evaporated.

The weight of the sample is determined, and after correction for residue from petroleum ether the amount of oil in the soluble coffee powder is determined to be 0.17%.

EXAMPLE II

The procedure of Example I is followed but coffee oil is added to one 15 g sample of the soluble coffee of Example I at an estimated level of 1.0% and coffee oil is added to a second sample at an estimated level of 1.5%. After following the procedures of Example I, tests were performed over a period of from 10 to 13 days to determine reproducibility of results, which are demonstrated as follows:

| Estimated Oil = 1.17% (1% Applied + 0.17% in Soluble Powder) | | Estimated Oil = 1.67% (1.5% Applied + 0.17% in Soluble Powder) | |
|---|---|---|---|
| Analysis | Percent Oil | Analysis | Percent Oil |
| 1 | 1.32% | 1 | 1.55% |
| 2 | 1.32% | 2 | 1.65% |
| 3 | 1.33% | 3 | 1.74% |
| 4 | 1.26% | 4 | 1.66% |
| 5 | 1.27% | 5 | 1.58% |
| 6 | 1.28% | 6 | 1.63% |
| Mean % Oil | 1.30% | | 1.63% |
| Standard Deviation | ±0.027 | | ±0.060 |
| Coefficient of Variation | 2.12% | | 3.70% |

COMPARISON EXAMPLE I

The procedure of the ester-release method of the present invention is compared with the direct solvent extraction Goldfisch procedure referred to above. The data below are from 6 individual determinations.

| | Ester-Release Method | | Goldfisch Procedure | |
|---|---|---|---|---|
| | % Oil Mean Value | Coefficient of Variation | % Oil Mean Value | Coefficient of Variation |
| Powder of Example I | 0.170% | 5.71% | 0.030% | 13.33% |
| Sample with Estimated Oil at 0.27% | 0.358% | 3.52% | 0.152% | 13.95% |
| Sample with Estimated Oil at 1.67% | 1.633% | 3.70% | 1.19% | 9.35% |

This demonstrates that the Goldfisch procedure extracts 27% less oil from sample 3 57% less oil from sample 2 and 82% less oil from sample 1, as compared with the present ester-release method. The ester-release method of the present invention obtains much more oil for the analytical determination, particularly at very low concentrations of oil, than does the Goldfisch procedure, and thus, as an analytical method, the present ester-release method provides improved sensitivity and provides less deviation of results as compared with the Goldfisch procedure.

COMPARISON EXAMPLE II

Sample 2 of Comparison Example I, above, having an estimated oil content of 0.27% is taken up by celite in accordance with the ester-release method of the present invention, but thereafter the amount of oil in the samples is determined by the traditional Goldfisch procedure and by the traditional Soxhlet method. One experiment is performed utilizing the Soxhlet method and the percent oil is 0.349%. Six experiments are performed utilizing the Goldfisch method.

| Goldfisch Samples | Percent Oil Found | |
|---|---|---|
| 1 | .379% | |
| 2 | .359% | |
| 3 | .366% | |
| 4 | .349% | |
| 5 | .367% | |
| 6 | .339% | |
| Mean | | .358% |
| Standard Deviation | | ±.013 |
| Coefficient of Variation | | 3.52% |

This demonstrates, together with Comparison Example I, that utilization of the ester-release method of the present invention of adding water for dissociating and releasing the esters from the materials and absorbing the liquid with an inert absorbing substance and extracting the esters for the analytical determination, as disclosed above, is the critical factor for obtaining consistent analytical results.

EXAMPLE III 50 g of dry Pinto beans are ground to a fine powder. 12 g of the beans are weighed into a 250 ml beaker. 80 ml of water are added to the beaker and mixed thoroughly with the beans. The mixture is heated in a steam bath for 1 hour with stirring every 7 to 8 minutes. The sample is then cooled to room temperature (~21° C.). 40 g of celite is added and mixed with the sample. The celite mixed sample is dried in a vacuum oven at 100° C. until dry. The dried sample is ground with a mortar and pestle and extracted in a Goldfisch extraction unit with petroleum ether.

The total fat released, dissociated, obtained and determined is 0.1255 g which is 1.05% by weight of the initial sample of 12 g.

COMPARISON EXAMPLE III 12 g of the ground Pinto beans of Example III are directly extracted in a Goldfisch extraction unit following the Goldfisch procedure. The amount of total fat determined by this procedure is 0.1031 g which is 0.86% by weight of the initial 12 g sample. Approximately 22% more fat is obtained by utilizing the ester-release method of the present invention as compared with direct extraction by the Goldfisch procedure.

EXAMPLE IV

A quantity of large fresh raw shrimp are shelled and washed. No attempt is made to recover any fat from the shells.

54 g of the shelled and washed raw shrimp are macerated in a WARING blender with 30 g of water. This sample is transferred to a 250 ml beaker in a quantitative manner. The sample is boiled on a hot plate for one hour with magnetic stirring. The heated, mixed sample is cooled to room temperature (~21° C.) and 25 g of celite is mixed thoroughly with the sample. The celite sample mixture is dried in a vacuum oven at 100° C. The dried sample is ground with a mortar and pestle and extracted in a Goldfisch extraction unit with petroleum ether for 1½ h.

The total fat extracted is 0.1091 g which is 0.202% by weight of the initial sample.

COMPARISON

EXAMPLE IV 34 g of the shelled and washed raw shrimp of Example IV are macerated, dried in a vacuum oven and extracted by the Goldfisch method with petroleum either for 1½ h. The total fat extracted is 0.0208 g which is 0.0612% by weight of the initial sample.

More than 3 times the amount of fat is obtained from shrimp by the present ester-release method as compared with direct extraction by the Goldfisch procedure.

As will be clear to one skilled in the art, variations and modifications may be made to the present invention without departing from the spirit and scope of the invention as defined by the following claims.

I claim:

1. A process for obtaining glycerol fatty acid esters from glycerol fatty acid ester-containing materials comprising:
   - adding water to glycerol fatty acid ester-containing materials for dissociating and releasing glycerol fatty acid esters from the materials into water for forming a liquid comprising water and the glycerol fatty acid esters;
   - absorbing the liquid with an inert absorbing substance;
   - drying the inert absorbing substance containing the liquid for removing the water from the inert absorbing substance;
   - extracting the esters from the dried inert absorbing substance with a solvent for obtaining the esters in the solvent; and
   - removing the solvent from the extracted esters.

2. A process according to claim 1 wherein the ester-containing materials are water-soluble and the added water is added in an amount sufficient for dissolving the materials for dissociating and releasing the esters into the added water for thereby forming the liquid.

3. A process according to claim 1 wherein the ester-containing materials are non-water-soluble and the added water is added in an amount and under conditions sufficient for passing into and being absorbed by the materials and for providing an aqueous medium for expelling the esters from the materials for dissociating and releasing the esters from the materials into the added water for thereby forming the liquid.

4. A process according to claim 2 or 3 further comprising heating the added water and ester-containing materials and agitating the added water and materials at least periodically for dissociating and releasing the esters from the materials for thereby forming the liquid.

5. A process according to claim 4 further comprising cooling the liquid for obtaining at least some phase separation of water and esters prior to adding the inert absorbing substance to the liquid for absorbing the liquid.

6. A process according to claim 2 or 3 wherein the inert absorbing substance is added in an amount of from about 35% to about 75% by weight based upon the weight of the liquid.

7. A process according to claim 1 wherein the solvent is a solvent selected from the group consisting of $C_5$ to $C_7$ hydrocarbons and combinations thereof including petroleum ether and the inert absorbing substance is selected from the group consisting of diatomaceous earth, Fuller's earth, bentonite clay, cellulose fiber, microcrystalline cellulose, cellulose wood fiber, volcanic rock, cotton fibers and celite.

8. A process as claimed in claim 1 further comprising measuring the amount of esters from which the solvent is removed.

9. A process according to claim 8 wherein the liquid has a solids content below about 15% solids, and wherein the inert absorbing substance is added in an amount of from about 45% to 55% by weight based upon the weight of the liquid.

10. A process according to claim 3 wherein omega-3 fatty acids are associated with the esters of the ester-containing materials further comprising obtaining omega-3 fatty acids from the esters after removing the solvent.

* * * * *